US011061623B2

(12) United States Patent
Christiansen et al.

(10) Patent No.: US 11,061,623 B2
(45) Date of Patent: Jul. 13, 2021

(54) PREVENTING EXCESSIVE HYDRATION IN A STORAGE VIRTUALIZATION SYSTEM

(71) Applicant: Microsoft Technology Licensing, LLC, Redmond, WA (US)

(72) Inventors: Neal R. Christiansen, Bellevue, WA (US); Ravisankar V Pudipeddi, Bellevue, WA (US); Ping Xie, Redmond, WA (US); Craig Ashley Barkhouse, Duvall, WA (US); Michael J. Novak, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 180 days.

(21) Appl. No.: 15/581,769

(22) Filed: Apr. 28, 2017

(65) Prior Publication Data
US 2018/0060345 A1 Mar. 1, 2018

Related U.S. Application Data

(60) Provisional application No. 62/379,391, filed on Aug. 25, 2016.

(51) Int. Cl.
*G06F 3/06* (2006.01)
*G06F 16/13* (2019.01)
*G06F 16/11* (2019.01)
*G06F 16/182* (2019.01)
*G06F 16/188* (2019.01)
*G06F 16/17* (2019.01)
(Continued)

(52) U.S. Cl.
CPC ............ *G06F 3/0667* (2013.01); *G06F 3/067* (2013.01); *G06F 3/0611* (2013.01); *G06F 3/0643* (2013.01); *G06F 3/0659* (2013.01); *G06F 16/122* (2019.01); *G06F 16/13* (2019.01); *G06F 16/16* (2019.01); *G06F 16/1734* (2019.01); *G06F 16/182* (2019.01); *G06F 16/188* (2019.01); *H04L 67/1097* (2013.01)

(58) Field of Classification Search
CPC .... G06F 3/0667; G06F 16/182; G06F 16/188; G06F 16/122; G06F 16/16
USPC ........................................................ 707/825
See application file for complete search history.

(56) References Cited

U.S. PATENT DOCUMENTS 5,931,935 A 8/1999 Cabrera et al.
5,978,815 A 11/1999 Cabrera et al.
(Continued)

OTHER PUBLICATIONS

"Cloud Drive Virtualization Technology", In white Paper of Cameyo, May 2015, pp. 1-5.
(Continued)

*Primary Examiner* — Hosain T Alam
*Assistant Examiner* — Nicholas E Allen

(57) ABSTRACT

Storage virtualization techniques allow files and directories to be stored remotely, for example, by a cloud storage provider, but in a manner that appears to a user or application running on a local computing device as if the files are stored locally—even though the data of those files and directories may not be resident on the local computing device. That is, the contents of files and directories that may exist in the cloud look and behave as if they were stored locally on a computing device. The level of hydration of placeholders may be monitored and operations may be performed to reduce the impact of excessive hydration on the resources of the computing device.

18 Claims, 11 Drawing Sheets

(51) Int. Cl.
*G06F 16/16* (2019.01)
*H04L 29/08* (2006.01)

(56) References Cited

U.S. PATENT DOCUMENTS

| | | | |
|---|---|---|---|
| 6,327,608 B1 | 12/2001 | Dillingham | |
| 6,754,696 B1 | 6/2004 | Kamath et al. | |
| 7,069,393 B2 | 6/2006 | Miyata et al. | |
| 7,155,465 B2 | 12/2006 | Lee et al. | |
| 7,236,987 B1 | 6/2007 | Faulkner et al. | |
| 7,634,514 B2 | 12/2009 | Langan et al. | |
| 7,636,818 B2 | 12/2009 | Tamura et al. | |
| 8,903,874 B2 | 12/2014 | Mason et al. | |
| 9,043,919 B2* | 5/2015 | Wyatt | G06F 21/564 707/708 |
| 9,167,313 B1 | 10/2015 | Bacco | |
| 9,239,762 B1* | 1/2016 | Gunda | G06F 11/1448 |
| 9,424,062 B1 | 8/2016 | Mummidi et al. | |
| 2004/0117369 A1 | 6/2004 | Mandal et al. | |
| 2004/0225719 A1 | 11/2004 | Kisley et al. | |
| 2005/0027796 A1 | 2/2005 | San andres et al. | |
| 2006/0117018 A1 | 6/2006 | Christiansen et al. | |
| 2007/0022091 A1 | 1/2007 | Styles et al. | |
| 2007/0244987 A1* | 10/2007 | Pedersen | H04L 67/06 709/217 |
| 2010/0037089 A1 | 2/2010 | Krishnan et al. | |
| 2010/0332452 A1* | 12/2010 | Hsu | G06F 3/0619 707/640 |
| 2011/0197184 A1 | 8/2011 | Sheehan | |
| 2011/0276622 A1 | 11/2011 | Knapp et al. | |
| 2012/0303670 A1* | 11/2012 | Gillen | G06F 9/5072 707/797 |
| 2013/0159381 A1 | 6/2013 | Morgan | |
| 2013/0166855 A1 | 6/2013 | Batwara et al. | |
| 2013/0204849 A1 | 8/2013 | Chacko | |
| 2013/0226876 A1* | 8/2013 | Gati | G06F 16/178 707/652 |
| 2013/0275541 A1 | 10/2013 | Wang et al. | |
| 2013/0282654 A1* | 10/2013 | Chen | G06F 16/25 707/610 |
| 2013/0282979 A1 | 10/2013 | Suzuki | |
| 2013/0339319 A1* | 12/2013 | Woodward | G06F 11/1461 707/692 |
| 2013/0339407 A1 | 12/2013 | Sharpe et al. | |
| 2014/0006725 A1 | 1/2014 | Shiomi | |
| 2014/0040446 A1 | 2/2014 | Cohen et al. | |
| 2014/0040979 A1* | 2/2014 | Barton | H04L 63/20 726/1 |
| 2014/0324776 A1 | 10/2014 | Novak et al. | |
| 2014/0324945 A1* | 10/2014 | Novak | G06F 3/067 709/203 |
| 2014/0330874 A1 | 11/2014 | Novak et al. | |
| 2015/0106813 A1* | 4/2015 | Mihalocivi | H04L 47/125 718/1 |
| 2015/0169624 A1* | 6/2015 | Gupta | G06F 16/951 707/639 |
| 2015/0236959 A1* | 8/2015 | Cai | H04L 47/125 709/235 |
| 2015/0295808 A1* | 10/2015 | O'Malley | H04L 47/22 709/224 |
| 2015/0309838 A1 | 10/2015 | Steele | |
| 2015/0319185 A1* | 11/2015 | Kirti | H04L 63/1416 726/23 |
| 2016/0011816 A1* | 1/2016 | Aizman | G06F 3/0604 711/117 |
| 2016/0087933 A1* | 3/2016 | Johnson | H04W 4/70 709/245 |
| 2016/0092266 A1* | 3/2016 | Bavishi | G06F 9/4856 718/1 |
| 2016/0103878 A1* | 4/2016 | Boe | G06F 16/903 707/718 |
| 2016/0140150 A1* | 5/2016 | DeLuca | G06F 16/1734 707/754 |
| 2016/0142482 A1* | 5/2016 | Mehta | H04L 67/1095 709/203 |
| 2016/0196320 A1* | 7/2016 | Borowiec | G06F 3/0608 707/624 |

OTHER PUBLICATIONS

"Non Final Office Action Issued in U.S. Appl. No. 15/493,403", dated Nov. 20, 2018, 23 Pages.

"International Search Report and Written Opinion Issued in PCT Application No. PCT/US2017/047710", dated Oct. 4, 2017, 13 Pages.

"Directory( Computing)", Retrieved From: https://en.wikipedia.org/wiki/Directory_(computing), Retrieved on: Oct. 26, 2019, 2 Pages.

"Microsoft Computer Dictionary, Fourth Edition", Published by Microsoft Press, 1999, 3 Pages.

"NTFS reparse point—Wikipedia, The Free Encyclopedia", Retrieved From: https://en.wikipedia.org/wiki/NTFS_reparse_point, Dec. 23, 2009, 1 Page.

"Final Office Action Issued in U.S. Appl. No. 15/493,403", dated Jun. 12, 2019, 28 Pages.

"Non Final Office Action Issued in U.S. Appl. No. 15/493,403", dated Nov. 21, 2019, 29 Pages "Final Office Action Issued in U.S. Appl. No. 15/493,517", dated Oct. 30, 2019, 21 Pages.

"Non Final Office Action Issued in U.S. Appl. No. 15/493,517", dated May 30, 2019, 19 Pages.

Bolosky, et al. "Single Instance Storage in Windows 2000", In Proceedings of the 4th USENIX Windows Systems Symposium 2000 , Aug. 3, 2000, 12 Pages.

Howard, et al., "Scale and Performance in a Distributed File System", Retrieved From: Journal of ACM Transactions on Computer Systems, vol. 6, Issue 1, Feb. 1988, 31 Pages.

Mckusick, et al., "A Fast File System for UN IX", Published in ACM Transactions on Computer Systems, vol. 2, No. 3, pp. 181-197.

Microsoft Press, "Microsoft Computer Dictionary, Fifth Edition" 3 Pages.

"Notice of Allowance Issued in U.S. Appl. No. 15/493,517", dated Jun. 12, 2020, 9 Pages.

Reed, et al., "Security Considerations When Designing a Distributed File System Using Object Storage Devices", In Proceeding of the First International Security in Storage Workshop, Dec. 11, 2002, 11 Pages.

\* cited by examiner

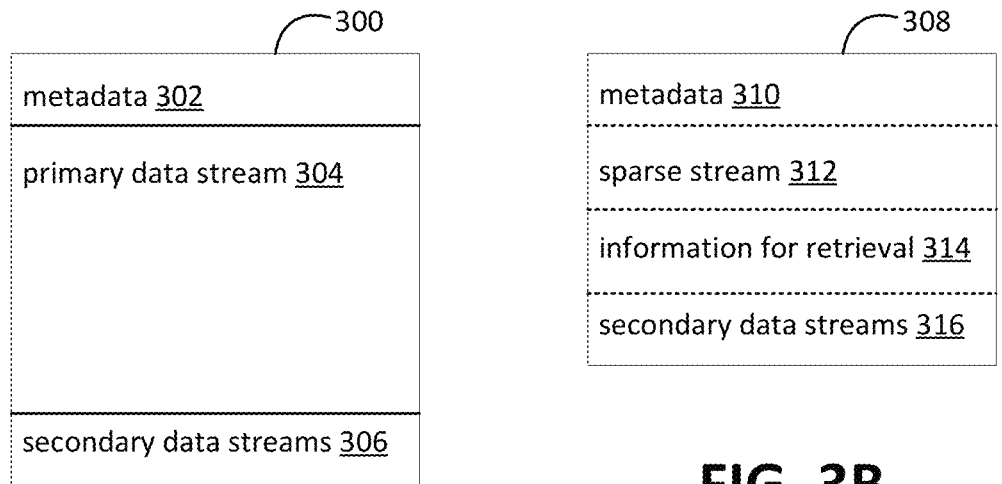
FIG. 3A
FIG. 3B
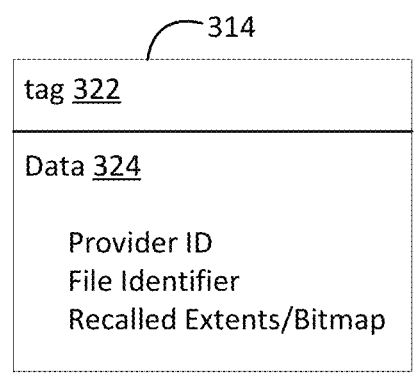
FIG. 3C

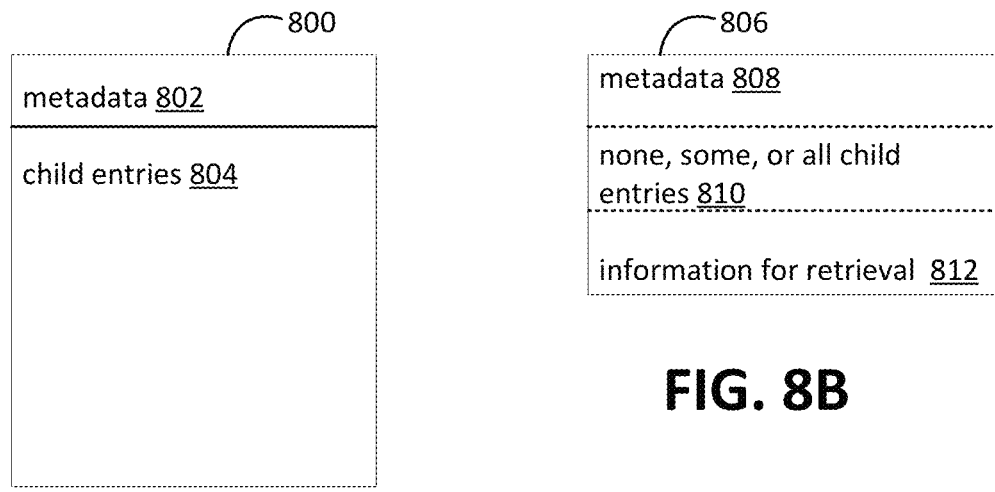
FIG. 8A
FIG. 8B
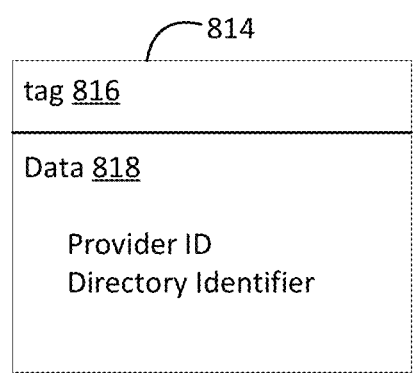
FIG. 8C

PREVENTING EXCESSIVE HYDRATION IN A STORAGE VIRTUALIZATION SYSTEM

CROSS-REFERENCE TO RELATED APPLICATIONS

This application claims the benefit of U.S. Provisional Patent Application No. 62/379,391, filed on Aug. 25, 2016, titled "Storage Virtualization," the content of which is hereby incorporated by reference in its entirety.

BACKGROUND

With the ever increasing need for data storage in computer systems, the use of cloud storage providers is increasing. With cloud storage, the data of a file or directory is stored "in the cloud" rather than on a user's local computing device. When the data for a file or directory is needed, it can be pulled "from the cloud" back onto the user's local computing device. Typically, the user must install cloud provider software on the user's local computing device which manages the storage and retrieval of files to/from the cloud provider service and the syncing of data between the local computing device and the cloud storage. Unfortunately, with cloud storage providers, the process of accessing and working with files is not as seamless as when those files are stored locally on the computing device.

SUMMARY

Disclosed herein are storage virtualization techniques that allow files and directories to be stored remotely, for example, by a cloud storage provider, but in a manner that appears to a user or application running on a local computing device as if the files are stored locally—even though the data of those files and directories may not be resident on the local computing device. That is, the contents of files and directories that may exist in the cloud look and behave as if they were stored locally on a computing device. In particular, in accordance with these storage virtualization techniques, a placeholder may be created on the local computing device for a file or directory. The placeholder appears to a user or application as a regular file or directory on the computing device, but it may not contain all the data of the file or directory. When an application desires to access (e.g., open, read, write, etc.) a file or directory that is stored as a placeholder, a file system filter intercepts the I/O access and, when needed, communicates the particulars of the access to a storage virtualization provider module executing on the computing device. When requested data is not stored locally, the storage virtualization provider will then operate to fetch the data for the file or directory from a remote location where it is stored (e.g., "from the cloud") and return the data to the file system filter. The file system filter can then provide the data to the requesting application in response to the I/O access and/or place the data in the file or directory on disk. In one embodiment, the storage virtualization provider executes in user-mode on the computing device, and a user-mode library may be provided to make implementation and development of a user-mode storage virtualization provider module easier and to hide details of the filter-provider communications. In accordance with another aspect, the level of hydration of placeholders may be monitored and operations may be performed to reduce the impact of excessive hydration on the resources of the computing device.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings:

FIG. 3A illustrates a regular file, in accordance with one embodiment;

FIG. 3B illustrates a placeholder for a file, in accordance with one embodiment;

FIG. 3C illustrates a reparse point for a placeholder for a file, in accordance with one embodiment;

FIG. 8A illustrates a regular directory, in accordance with one embodiment;

FIG. 8B illustrates a placeholder for a directory, in accordance with one embodiment;

FIG. 8C illustrates a reparse point for a placeholder directory, in accordance with one embodiment;

DETAILED DESCRIPTION OF ILLUSTRATIVE EMBODIMENTS

Disclosed herein are storage virtualization techniques that allow files and directories to be stored remotely, for example, by a cloud storage provider, but in a manner that appears to a user or application running on a local computing device as if the files are stored locally—even though the data of those files and directories is not resident on the local computing device. That is, the contents of files and directories that may exist in the cloud look and behave as if they were stored locally on a computing device.

Example Computing Device

Figure 1:
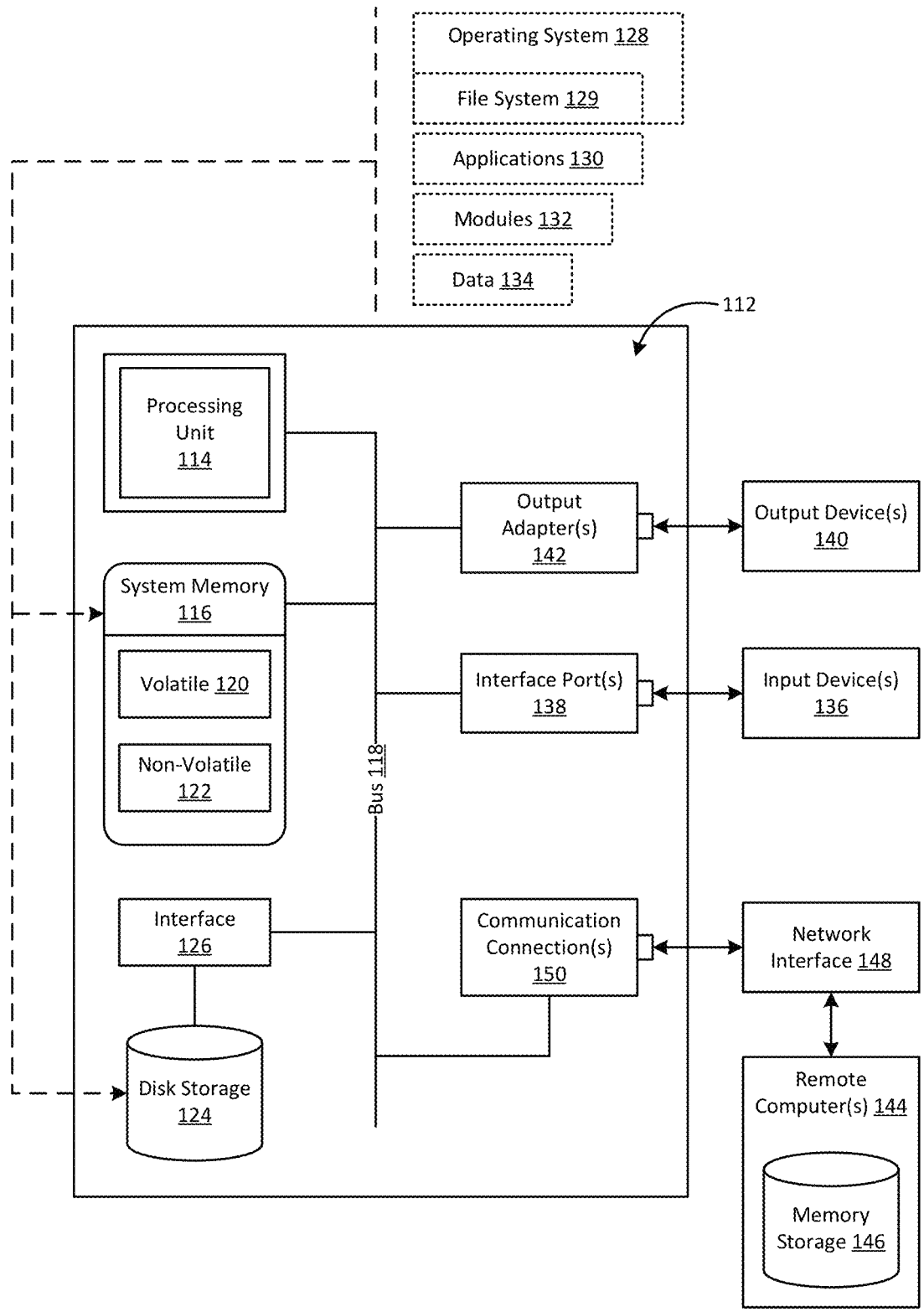
FIG. 1 illustrates an exemplary computing device, in which the aspects disclosed herein may be employed.

FIG. 1 illustrates an example computing device 112 in which the techniques and solutions disclosed herein may be implemented or embodied. The computing device 112 may be any one of a variety of different types of computing devices, including, but not limited to, a computer, personal computer, server, portable computer, mobile computer, wearable computer, laptop, tablet, personal digital assistant, smartphone, digital camera, or any other machine that performs computations automatically.

The computing device 112 includes a processing unit 114, a system memory 116, and a system bus 118. The system bus 118 couples system components including, but not limited to, the system memory 116 to the processing unit 114. The processing unit 114 may be any of various available processors. Dual microprocessors and other multiprocessor architectures also may be employed as the processing unit 114.

The system bus 118 may be any of several types of bus structure(s) including a memory bus or memory controller, a peripheral bus or external bus, and/or a local bus using any variety of available bus architectures including, but not limited to, Industry Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 116 includes volatile memory 120 and nonvolatile memory 122. The basic input/output system (BIOS), containing the basic routines to transfer information between elements within the computing device 112, such as during start-up, is stored in nonvolatile memory 122. By way of illustration, and not limitation, nonvolatile memory 122 may include read only memory (ROM), programmable ROM (PROM), electrically programmable ROM (EPROM), electrically erasable ROM (EEPROM), or flash memory. Volatile memory 120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computing device 112 also may include removable/non-removable, volatile/non-volatile computer-readable storage media, which may be referred to herein as secondary storage. FIG. 1 illustrates secondary storage, for example, in the form of a disk storage 124. Secondary storage (e.g., disk storage) 124 includes, but is not limited to, devices like a magnetic disk drive, floppy disk drive, tape drive, Jaz drive, Zip drive, LS-100 drive, memory card (such as an SD memory card), or memory stick. In addition, disk storage 124 may include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 124 to the system bus 118, a removable or non-removable interface is typically used such as interface 126. The terms disk storage and secondary storage may be used interchangeably herein.

FIG. 1 further depicts software that acts as an intermediary between users and the basic computer resources described in the computing device 112. Such software includes an operating system 128. Operating system 128, which may be stored on disk storage 124, acts to control and allocate resources of the computing device 112. Applications 130 take advantage of the management of resources by operating system 128 through program modules 132 and program data 134 stored either in system memory 116 or on disk storage 124. It is to be appreciated that the aspects described herein may be implemented with various operating systems or combinations of operating systems. As further shown, the operating system 128 includes a file system 129 for storing and organizing, on the disk storage 124, computer files and the data they contain to make it easy to find and access them.

A user may enter commands or information into the computing device 112 through input device(s) 136. Input devices 136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 114 through the system bus 118 via interface port(s) 138. Interface port(s) 138 include, for example, a serial port, a parallel port, a game port, and a universal serial bus (USB). Output device(s) 140 use some of the same type of ports as input device(s) 136. Thus, for example, a USB port may be used to provide input to computing device 112, and to output information from computing device 112 to an output device 140. Output adapter 142 is provided to illustrate that there are some output devices 140 like monitors, speakers, and printers, among other output devices 140, which require special adapters. The output adapters 142 include, by way of illustration and not limitation, video and sound cards that provide a means of connection between the output device 140 and the system bus 118. It should be noted that other devices and/or systems of devices provide both input and output capabilities such as remote computer(s) 144.

Computing device 112 may operate in a networked environment using logical connections to one or more remote computing devices, such as remote computing device(s) 144. The remote computing device(s) 144 may be a personal computer, a server, a router, a network PC, a workstation, a microprocessor based appliance, a peer device, another computing device identical to the computing device 112, or the like, and typically includes many or all of the elements described relative to computing device 112. For purposes of brevity, only a memory storage device 146 is illustrated with remote computing device(s) 144. Remote computing device(s) 144 is logically connected to computing device 112 through a network interface 148 and then physically connected via communication connection 150. Network interface 148 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 150 refers to the hardware/software employed to connect the network interface 148 to the bus 118. While communication connection 150 is shown for illustrative clarity inside computing device 112, it may also be external to computing device 112. The hardware/software necessary for connection to the network interface 148 includes, for exemplary purposes only, internal and external technologies such as modems including regular telephone grade modems, cable modems and DSL modems, ISDN adapters, and Ethernet cards.

As used herein, the terms "component," "system," "module," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

Storage Virtualization

Figure 2:
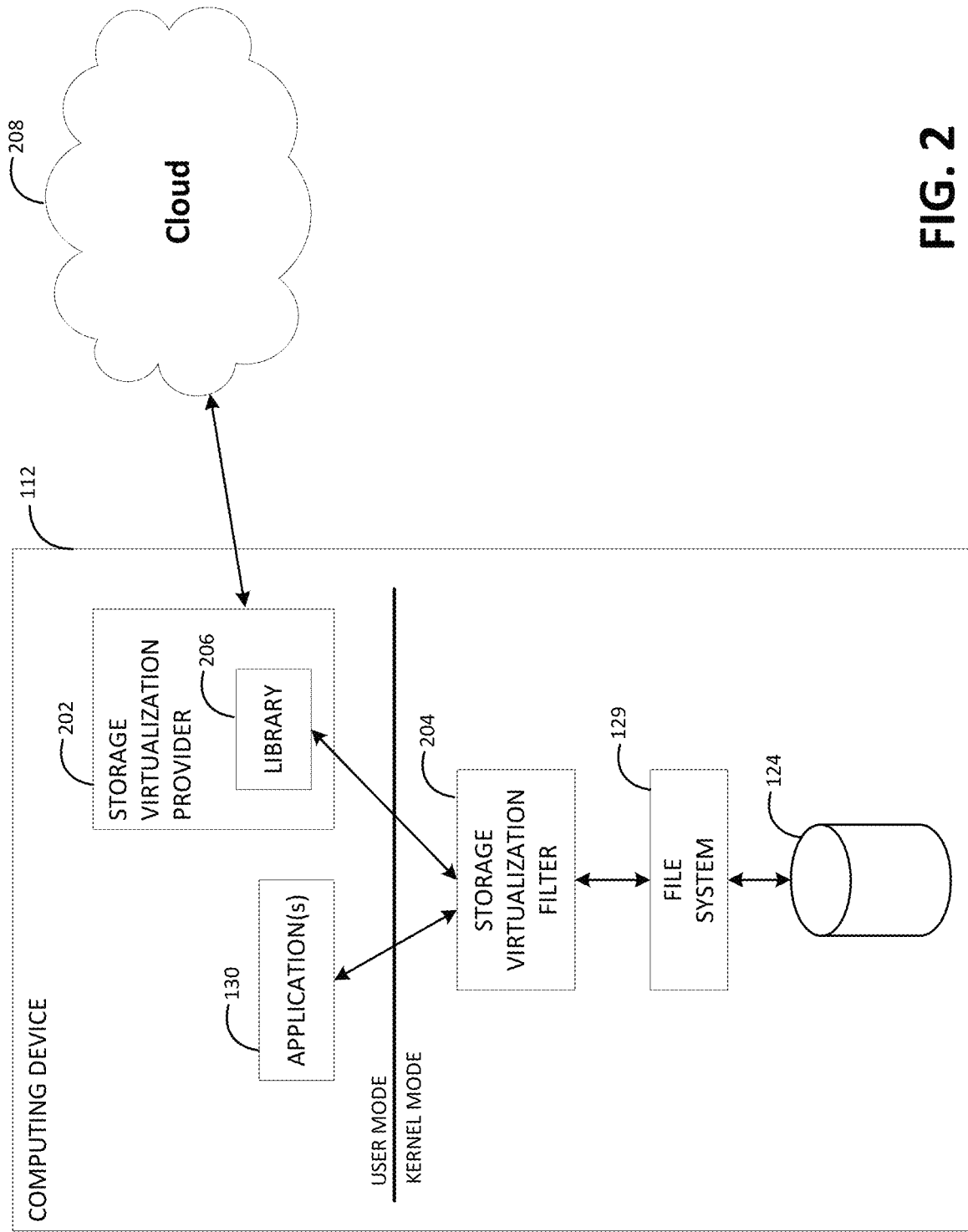
FIG. 2 illustrates an example architecture for storage virtualization in accordance with one embodiment.

In accordance with the storage virtualization techniques disclosed herein, a placeholder may be created on a local computing device for a file or directory. The placeholder appears to a user or application as a regular file or directory on the computing device. That is, an application can issue I/O calls on the file or directory as if the file or directory was stored locally, but the placeholder may not contain all the data of the file or directory. FIG. 2 is a block diagram illustrating the components of an architecture for implementing the storage virtualization techniques described herein, in accordance with one embodiment. As shown, in one embodiment, the architecture comprises: a user-mode storage virtualization provider module 202 responsible for retrieving remotely stored file and directory data from a network 208 (e.g., "from the cloud"); a file system filter 204, referred to herein as a storage virtualization filter, that creates and manages placeholders for files and directories and notifies the user-mode storage virtualization provider of access attempts to files or directories whose data is managed by the filter 204 and provider 202; and a user-mode library 206 that abstracts many of the details of provider-filter communication. Note that while the storage virtualization provider 202 runs in user-mode in the illustrated embodiment of FIG. 2, in other embodiments the storage virtualization provider 202 could be a kernel-mode component. The disclosed architecture is not limited to the user-mode embodiment described herein.

In the illustrated embodiment, the user-mode storage virtualization provider module 202 may be implemented (e.g., programmed) by a developer of a remote storage service or entity that provides remote storage services to computing device users. Examples of such remote storage services, sometimes also referred to as cloud storage services, include Microsoft OneDrive and similar services. Thus, there may be multiple different storage virtualization providers, each for a different remote storage service. In the illustrated embodiment, the storage virtualization provider module 202 interfaces with the storage virtualization filter 204 via application programming interfaces (APIs) defined and implemented by the user mode library 206. The storage virtualization provider module 202 implements the intelligence and functionality necessary to store and fetch file or directory data to/from a remote storage location (not shown) on the network 208.

The user-mode library 206 abstracts many of the details of communication between the storage virtualization filter 204 and the storage virtualization provider 202. This may make implementing a storage virtualization provider 202 easier by providing APIs that are simpler and more unified in appearance than calling various file system APIs directly. The APIs are intended to be redistributable and fully documented for third party's to develop storage virtualization providers for their remote storage services. Also, by implementing such a library 206, underlying provider-filter communication interfaces may be changed without breaking application compatibility.

As explained above, the storage virtualization techniques described herein may be applied to both files and directories in a computing device. For ease of illustration only, the operation of these storage virtualization techniques on files will be explained first, followed by an explanation of the operation of these techniques on directories.

Storage Virtualization for Files

In one embodiment, a file may begin either as a regular file or as a placeholder. FIG. 3A illustrates an example of a regular file 300. As shown, a regular file typically contains metadata 302 about the file (e.g., attributes, time stamps, etc.), a primary data stream 304 that holds the data of the file, and optionally one or more secondary data streams 306. In contrast, as illustrated in FIG. 3B, in one embodiment, a placeholder 308 comprises: metadata 310 for a file, which may be identical to the metadata 302 of a regular file 300; a sparse primary data stream 312 which may contain none or some data of the file (the rest of the data being stored remotely by a remote storage provider); information 314 which enables the remotely stored data for the file to be retrieved; and optionally one or more secondary data streams 316. Because all or some of the data for a file represented by a placeholder 308 is not stored as a primary data stream in the file, the placeholder 308 may consume less space in the local storage of a computing device. Note that a placeholder can at times contain all of the data of the file (for example because all of it was fetched), but as a placeholder, it is still managed by the storage virtualization filter 204 and storage virtualization provider 202 as described herein.

With reference to FIG. 3C, in one embodiment, the information 314 which enables the remotely stored data for the file to be retrieved comprises a reparse point 314. As shown, a reparse point is a data structure comprising a tag 322 and accompanying data 324. The tag 322 is used to associate the reparse point with a particular file system filter in the file system stack of the computing device. In the present embodiment, the tag identifies the reparse point as being associated with the storage virtualization filter 204. In one embodiment, the data 324 of the reparse point 314 may comprise a globally unique identifier (GUID) associated with the storage virtualization provider 202—to identify the storage virtualization provider 202 as the provider for the actual file data for the placeholder. In addition, the data 324 may comprise an identifier of the file itself, such as a file name or other file identifier.

In one embodiment, placeholders do not contain any of the file data. Rather, when there is a request to access the data of a file represented by the placeholder, the storage virtualization filter 204 must work with the storage virtualization provider 202 to fetch all of the file data, effectively restoring the full contents of the file on the local storage medium 124. However, in other embodiments, partial fetches of data are enabled. In these embodiments, some extents of the primary data stream of a file may be stored locally as part of the placeholder, while other extents are stored and managed remotely by the storage virtualization provider 202. In such embodiments, the data 324 of the reparse point of a placeholder may contain a data structure, such as an "on-disk" bitmap, that identifies extents (i.e. chunks) of the file that are stored locally versus those that are stored remotely. In one embodiment, such an on-disk bitmap may comprise a sequence of bits, where each bit represents one 4 KB chunk of the file. In other embodiments, each bit may represent a different size chunk of data. In one embodiment, a bit is set if the corresponding chunk is already present in the local storage. As described hereinafter, when a request to read an extent of a file represented by a placeholder is received, the storage virtualization filter 204 examines the on-disk bitmap to determine what parts of the file, if any, are not present on the local storage. For each range of a file that is not present, the storage virtualization filter 204 will then request the virtualization provider 202 to fetch those ranges from the remote storage.

Figure 4:
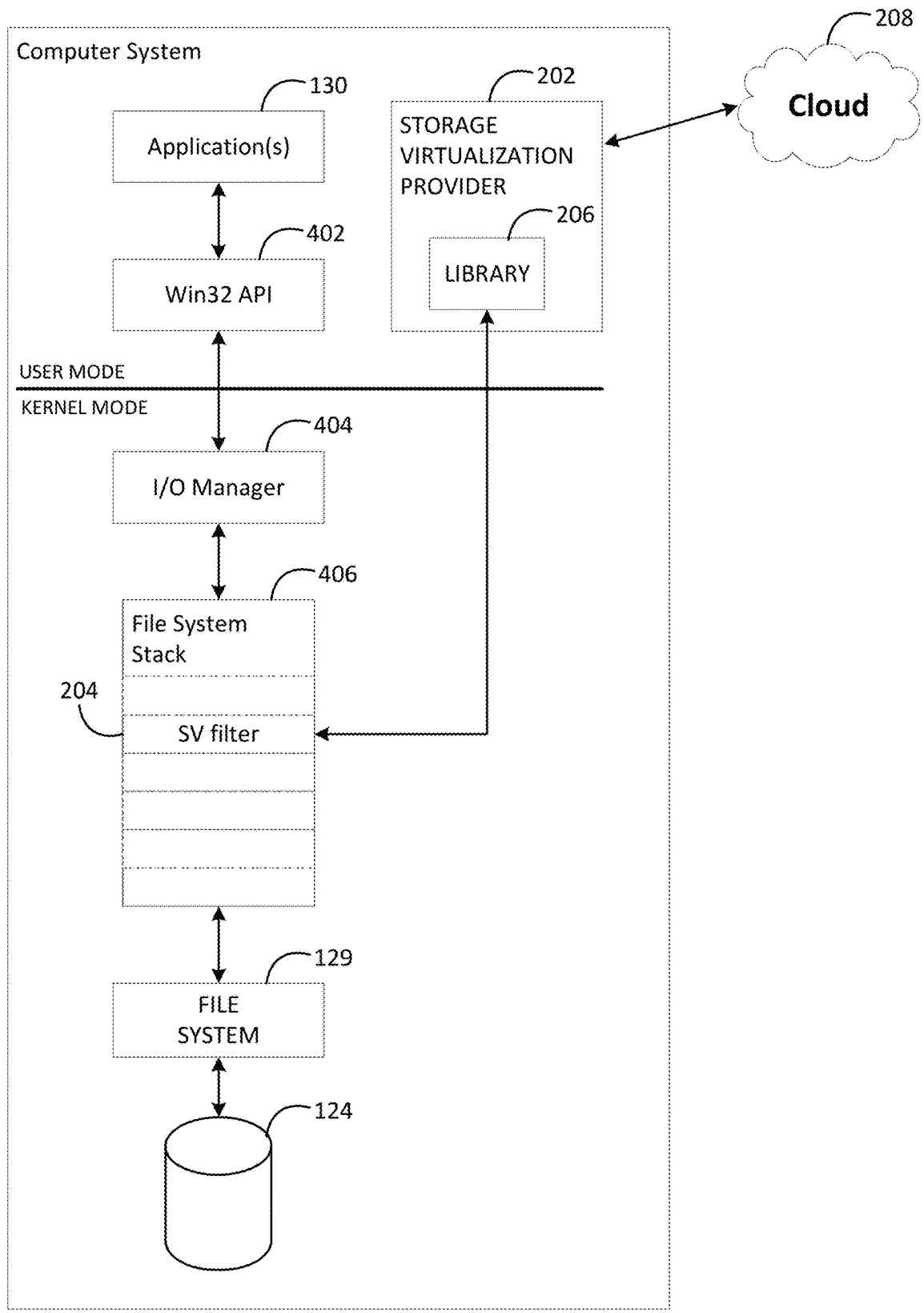
FIG. 4 illustrates further details of an architecture for storage virtualization in accordance with one embodiment.

FIG. 4 is a block diagram of the storage virtualization architecture of FIG. 2, as embodied in a computing device that implements the Microsoft Windows operating system and in which the file system 129 comprises the Microsoft NTFS file system. It is understood that the architecture illustrated in FIG. 4 is just one example, and the aspects of the storage virtualization solution described herein are in no way limited to implementation in this example environment. Rather, the aspects disclosed herein may be implemented in any suitable operating system and file system environment.

As shown in FIG. 4, an application 130 may perform file operations (e.g., create, open, read, write) by invoking an appropriate I/O call via the Win32 API 402 of the Windows operating system. These I/O calls will then be passed to an I/O Manager 404 in the kernel space of the operating system. The I/O Manager will pass the I/O call to the file system's stack, which may comprise one or more file system filters. Initially, the call will pass through these filters to the file system 129 itself. In the case of Microsoft's NTFS reparse point technology, if the file system accesses a file on disk 124 that contains a reparse point data structure, the file system will pass the I/O request back up to the stack 406. A file system filter that corresponds to the tag (i.e., globally unique identifier) of the reparse point will recognize the I/O as relating to a file whose access is to be handled by that filter. The filter will process the I/O and then pass the I/O back to the file system for proper handling as facilitated by the filter.

In the case of placeholder files described herein, the file system will pass the I/O request back up the stack to the storage virtualization filter 204, which will handle the I/O request in accordance with the methods described hereinafter.

Figure 5:
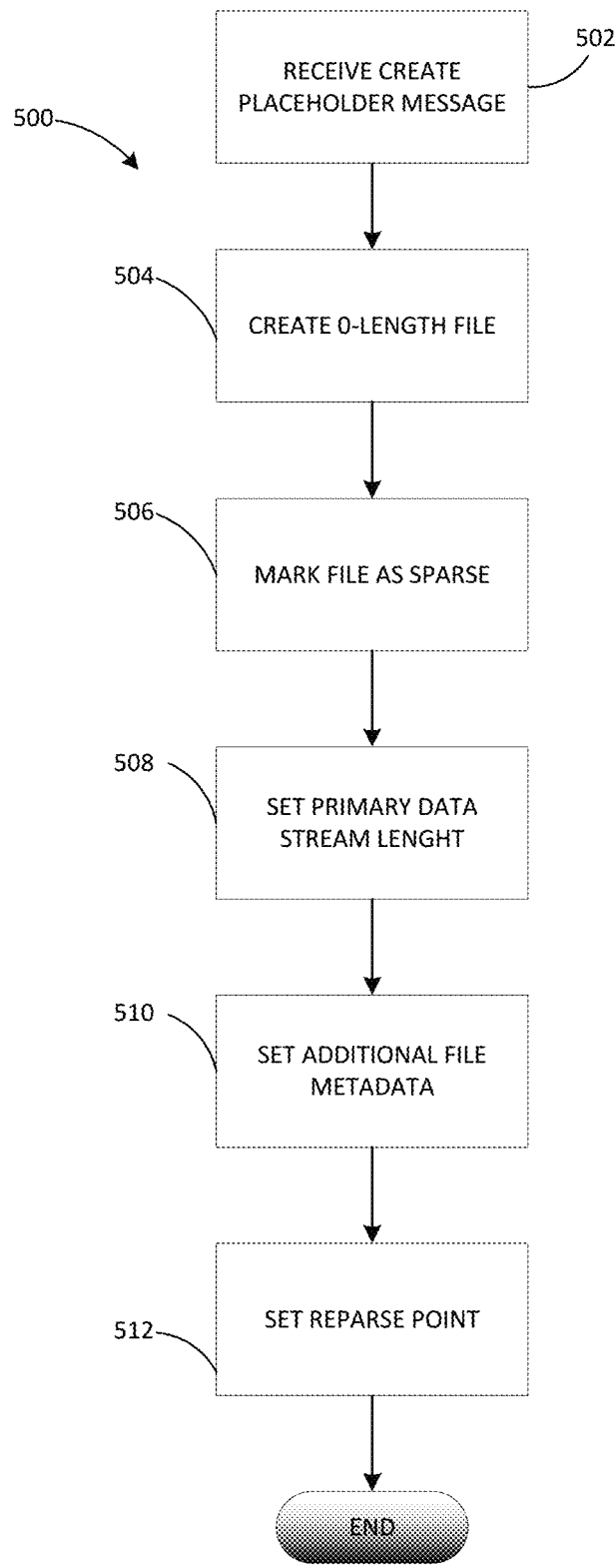
FIG. 5 illustrates a process of creating a placeholder for a file, in accordance with one embodiment.

With continued reference to FIG. 4, FIG. 5 is a flow diagram illustrating the steps performed by the storage virtualization filter 204 in order to create a placeholder for a file, in accordance with the example architecture illustrated in FIG. 4. The process may be initiated by the storage virtualization provider 202, which may call a CreatePlaceholders function of the user-mode library 206 to do so. The library 206 will, in turn, convert that call into a corresponding CreatePlaceholders message to the storage virtualization filter 204, which will receive that message in step 502 of FIG. 5. Next, in response to the CreatePlaceholders message, the storage virtualization filter 204 will create a 0-length file that serves as the placeholder, as shown at step 504. The CreatePlaceholders message will contain a file name for the placeholder, given by the storage virtualization provider 202. In step 506, the storage virtualization filter 204 will mark the 0-length file as a sparse file. In one embodiment, this may be done by setting an attribute of the metadata of the placeholder. A file that is marked as a sparse file will be recognized by the underlying file system as containing a sparse data set—typically all zeros. The file system will respond by not allocating hard disk drive space to the file (except in regions where it might contain nonzero data).

Continuing with the process illustrated in FIG. 5, in step 508, the storage virtualization filter 204 will set the primary data stream length of the file to a value given by the storage virtualization provider 202 in the CreatePlaceholders message. In step 510, the storage virtualization filter 204 sets any additional metadata for the placeholder file, such as time stamps, access control lists (ACLs), and any other metadata supplied by the storage virtualization provider 202 in the CreatePlaceholders message. Lastly, in step 512, the storage virtualization filter 204 sets the reparse point and stores it in the placeholder file. As described above in connection with FIG. 3C, the reparse point comprises a tag associating it with the storage virtualization filter 204 and data, which may include an identifier of the storage virtualization provider 202 that requested the placeholder, the file name or other file identifier given by the storage virtualization provider 202, and an on-disk bitmap or other data structure that identifies whether the placeholder contains any extents of the file data.

Once creation of the placeholder is completed, the placeholder will appear to a user or application (e.g., application(s) 130) as any other file stored locally on the computing device. That is, the details of the remote storage of the file data is effectively hidden from the applications(s).

In order for an application to issue I/O requests on a file, the application typically must first request the file system to open the file. In the present embodiment, an application will issue a CreateFile call with the OPEN_EXISTING flag set via the Win32 API. This request to open the file will flow down through the file system stack 406 to the file system 129. As described above, in the case of a placeholder file, the file system 129 will detect the presence of the reparse point in the file and will send the request back up the stack 406 where it will be intercepted by the storage virtualization filter 204. The storage virtualization filter 204 will perform operations necessary to open the file and will then reissue the request to the file system 129 in a manner that allows the file system to complete the file open operation. The file system will then return a handle for the opened file to the requesting application. At this point, the application 130 may then issue I/O calls (e.g., read, write, etc.) on the file.

Figure 6:
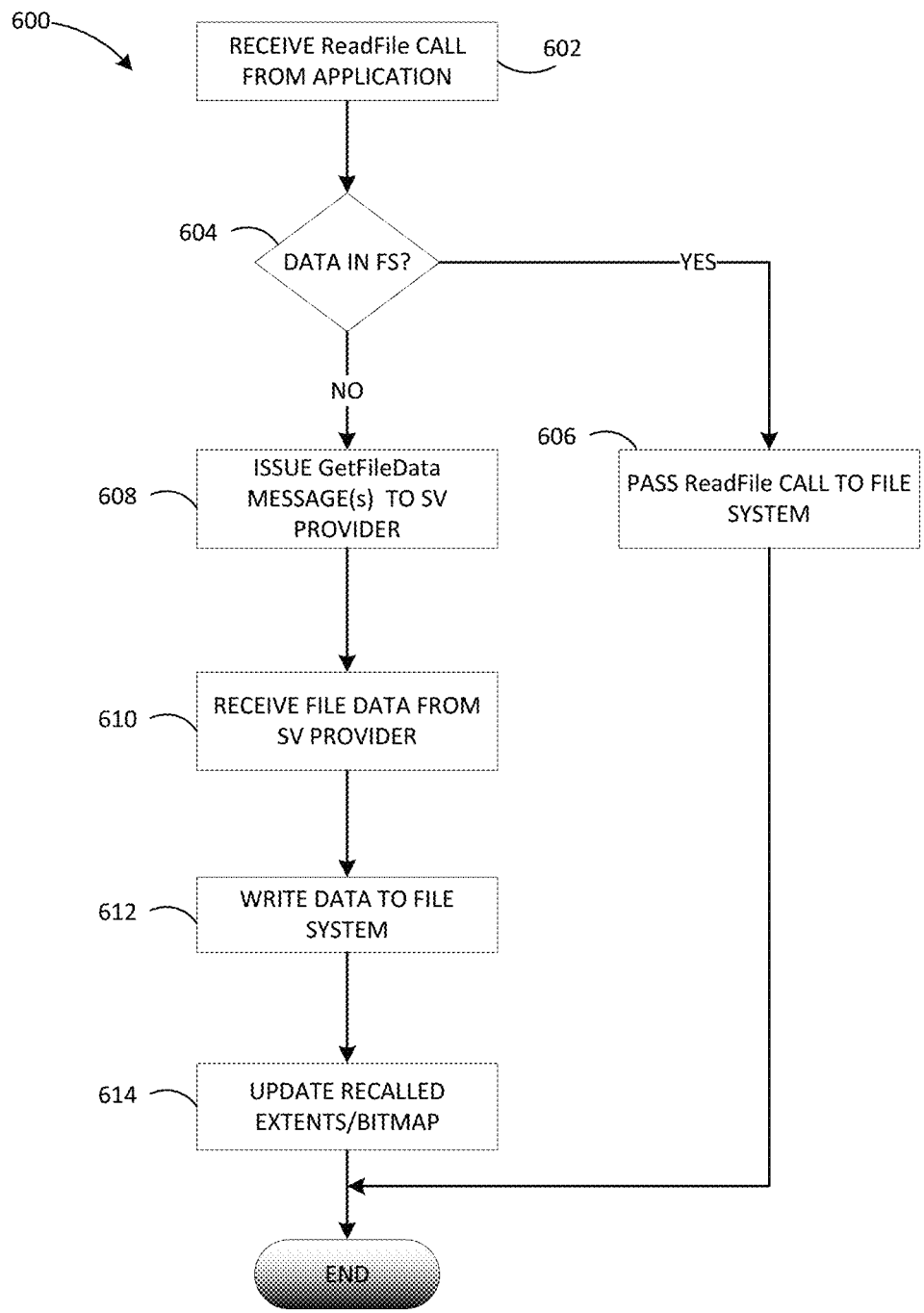
FIG. 6 illustrates a process of accessing file data for a placeholder, in accordance with one embodiment.

FIG. 6 is a flow diagram illustrating a method for processing an I/O request to read all or a portion of a file represented by a placeholder, in accordance with one embodiment. A request to read a file represented by a placeholder may come from an application 130 via the Win32 API 402 in the form of a ReadFile call. As shown, in step 602, the ReadFile call will be received by the storage virtualization filter 204. At step 604, the storage virtualization filter 204 will determine whether the requested range of data for the file is present in the placeholder or whether it is stored remotely by the storage virtualization provider 202. This determination may be made by examining the on-disk bitmap stored as part of the data of the reparse point for the placeholder. If the storage virtualization filter 204 determines that the requested range of data is stored locally (for example, because it was fetched from remote storage in connection with a prior I/O request), then in step 606 the storage virtualization filter 204 will pass the ReadFile call to the file system 129 for normal processing. The file system will then return the data to the requesting application.

Figure 7A:
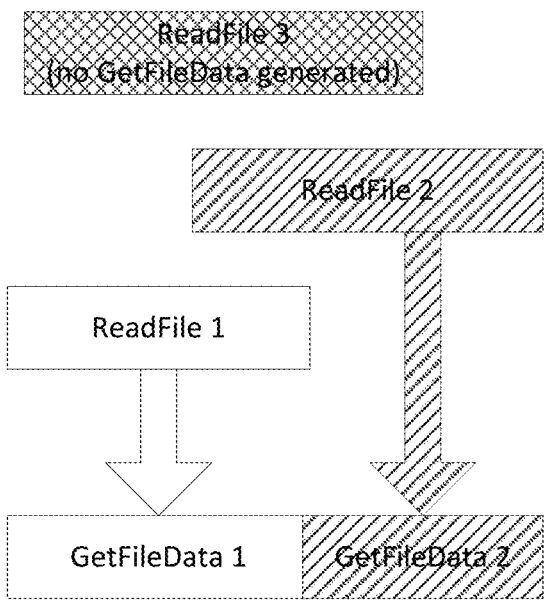
FIG. 7 illustrates further details of the file data access process of FIG. 6.

If all or some of the data is not present in the local storage, then in step 608 the storage virtualization filter 204 must formulate one or more GetFileData requests to the storage virtualization provider 202 to fetch the required data. Reads typically result in partial fetches, while some data-modifying operations may trigger fetching of the full file. Once the desired fetch range is determined, the storage virtualization filter 204 must decide whether to generate a GetFileData request for all, some, or none of the range. Preferably, the filter tries to generate a GetFileData for a particular range only once. So, if an earlier GetFileData request is outstanding, and another operation arrives whose requested range overlaps the outstanding GetFileData request, the filter 204 will trim the range needed by the second operation so that its GetFileData request to the provider 202 does not overlap the previous request. This trimming may result in no GetFileData request at all. FIG. 7A illustrates this functionality.

As shown in FIG. 7A, a second ReadFile request ("ReadFile 2") overlaps a prior request ("ReadFile 1"). So, the storage virtualization filter 204 trims the request range of the GetFileData request that it generates to the storage virtualization provider 202. A third ReadFile request ("ReadFile 3") is fully encompassed by the two prior requests, so there is no need for the filter 204 to fetch data to satisfy that request. All the data requested by ReadFile 3 will have already been fetched in response to the previous two requests. Thus, as illustrated, the storage virtualization filter 204 determines whether any portion of the remotely stored data it needs to retrieve (i.e., the data for which it has determined one or more GetFileData requests is needed) has previously been requested from the storage virtualization provider 202 but not yet received, and then if so, it trims any new requests to the storage virtualization provider so that they do not overlap with any such previously requested but not yet received data.

Figure 7B:
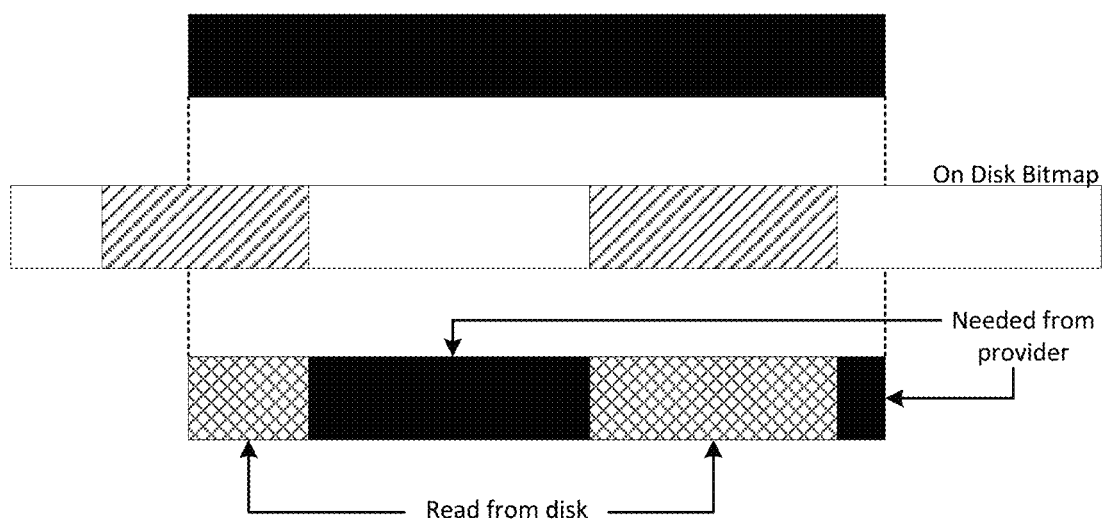

As illustrated in FIG. 7B, the storage virtualization filter 204 may determine which ranges of file data need to be requested from the storage virtualization provider 202 by examining the on-disk bitmap that, in one embodiment, is maintained as part of the data of the reparse point of the placeholder. The bitmap is depicted as the middle rectangle in the diagram. Ranges of the file that are already stored on disk are indicated by the hatched spaces in the bitmap. As mentioned above, each bit of the bitmap may indicate the status of a corresponding range (e.g., each bit may represent a corresponding 4 KB range) of the file represented by the placeholder. As illustrated in FIG. 7B, after examining the bitmap, the storage virtualization filter 204 is able to determine which data can be read from disk and which data is needed from the storage virtualization provider 202. The bottom rectangle illustrates the result of comparing the ReadFile request with the on-disk bitmap. The regions the filter will read from disk are indicated, as are the regions the filter will need to obtain from the provider 202.

In one embodiment, the storage virtualization filter 204 may also maintain a tree of in-flight GetFileData requests for each file. Each entry in the tree records the offset and length of data the filter has requested from the provider and not yet received. The tree may be indexed by the file offset. For each region the filter 204 determines is not yet present, the filter 204 may consult the in-flight tree to determine whether any of the regions it may need have already been requested. This may result in further splitting of the GetFileData requests. Once the filter has determined the final set of GetFileData requests it needs to send, it may insert the GetFileData requests into the in-flight tree and sends them to the provider 202.

Referring again to FIG. 6, the storage virtualization filter 204 will issue any necessary GetFileData requests to the storage virtualization provider 202 in step 608. Upon receipt, the user-mode library incorporated in the storage virtualization provider 202 will invoke a corresponding GetFileData callback function implemented by the storage virtualization provider 202. The storage virtualization provider 202 will then perform operations necessary to retrieve the requested data from remote storage on the network. The storage virtualization provider 202 will then return the data to the library 206, and in step 610, the requested file data is returned to the storage virtualization filter 204. At this point, there are two alternatives.

In one alternative, the storage virtualization filter issues a WriteFile request to the file system 129 requesting that the fetched data be written to the data stream of the placeholder. Then, in step 614, the storage virtualization filter 204 will update the on-disk bitmap to indicate that the particular range(s) of data now resides on disk. Note that in one embodiment, the storage virtualization filter 204 makes a distinction between unmodified resident data and modified resident data, and this distinction can potentially help with differential syncing of resident and remote data.

Alternatively, in accordance with another feature of the storage virtualization solution described herein, instead of writing the fetched data to disk, the storage virtualization filter 204 may return the requested data to the application 130 directly, without storing the data on disk. This may be advantageous in situations where disk space is already limited. This feature may also be used to implement a form of data streaming from the remote storage to the requesting application.

According to another aspect of the storage virtualization techniques described herein, the storage virtualization filter 204 may also initiate and manage the conversion of a regular file to a placeholder. During this process, a placeholder will be created for the file as described above, and the data of the primary data stream of the regular file will be sent to the storage virtualization provider 202 for remote storage on the network. For ease of description only, the method of converting a regular file to a placeholder and moving its primary data stream data to remote storage may be referred to as "dehydration," and the method of fetching the remotely stored data of a placeholder from remote storage and writing it back to disk may be referred to as "hydration."

According to another aspect, a new "in-sync" attribute may be added to the attributes of a placeholder. The in-sync attribute may be cleared by the storage virtualization filter 204 to indicate when some content or state of a placeholder file has been modified, so that the storage virtualization filter 204 and storage virtualization provider 202 may know that a synchronization should be performed. The in-sync attribute may be set by the storage virtualization provider 202 after the storage virtualization provider has verified that the local contents of the file match the contents stored remotely (e.g., in the cloud).

According to yet another aspect, a new "pinned" attribute may be added to the attributes of a file. This attribute may be set by an application to indicate to the storage virtualization filter 204 that the file should not be converted to a placeholder. For example, the storage virtualization filter 204 may be instructed automatically to convert files to placeholders as disk space falls below a certain threshold. But in the case of a file whose pinned attribute has been set, the storage virtualization filter 204 would not convert that file to a placeholder during any such attempt to reduce disk usage. This gives users and applications a level of control over conversion of files to placeholders, in the event that it is important to the user or application that the data of a file remain stored locally. Also important is that the user may prefer to reduce the disk usage on the local computer by not having certain placeholder files/directories fully hydrated by default. In this case, the "pinned" attribute may be combined with another new "online-only" attribute to express the user intent of keeping the content online by default and retrieving it on demand.

According to another aspect of the storage virtualization techniques described herein, a method is provided for detecting and addressing excessive hydration of placeholder files. The two critical system resources that any storage virtualization solution needs to manage are disk space and network usage. Applications written for today's PC ecosystem are not aware of the difference between a normal file and a file hosted on a remote endpoint, such as public cloud services. When running unchecked, these applications can potentially cause excessive hydration of the placeholder files resulting in consumption of disk space and network bandwidth that is not expected by the end user; worse still they might destabilize the operating system to a point that critical system activities are blocked due to low disk/network resources. As used herein, the existence of excessive hydration of placeholder files may be referred to as "runaway hydration." Exemplary applications that may cause runaway hydration are search indexer, anti-virus, and media applications, among others.

In various embodiments, detecting runaway hydration can be performed in a few different ways. At the minimum, the computing system can choose a static approach of reserving either a fix amount or a percentage of the disk/network resources for critical operating system activities. A baseline of compatible and/or incompatible applications can also be established a priori, with or without user's help. The system can then regulate the resource utilization on a per-application basis. Additionally, known incompatible applications can be modified at runtime via various mechanisms such as an AppCompat engine such that their behavior changes when working with placeholders. However, static approaches like the aforementioned may not be able to scale up to address all the legacy applications in the current PC ecosystem. Therefore, it may be desired to be able to detect runaway hydration at runtime and mitigate it early on. A good heuristic and starting point for detecting runaway hydration at runtime is by monitoring bursts of hydration activities that span across multiple placeholders simultaneously or within a very short period of time. The access pattern on placeholders can be obtained by monitoring all requests to the placeholders in the file system stack or network usage by storage virtualization providers or both. Note that the heuristic alone may not be sufficient nor accurate enough in detecting runaway hydration in all cases. User intention may need to be taken into account as well to help differentiate a real runaway hydration case from a legitimate mass hydration case that is either initiated or blessed by the user. It may be effective and efficient to allow the user to participate in the runaway hydration detection but at the same time not overwhelm the user with all trivial popups.

According to further aspects of the runaway hydration detection and remediation concepts disclosed herein, a number of options exist after identifying runaway hydration. In one embodiment, from the perspective of disk space, the file system may choose to continue serving the I/O requests on the placeholders but not store the returned data on the local disk; that is, not write (i.e., cache) the returned data to the sparse primary data streams of the placeholders. This is a form of streaming, as discussed above. In another embodiment, after runaway hydration is detected, the storage virtualization filter 204 may prevent a given application from opening any more placeholders whose contents do not currently reside on the local secondary storage. In yet another embodiment, policies may be enforced to control the response of the computing device when excessive hydration is detected. For example, in one embodiment, the file system may operate in accordance with a policy that directs the file system to dehydrate oldest cached data either periodically or when disk space is urgently required. That is, where some data for a file represented by a placeholder does reside in the placeholder, that data can be moved back to remote storage. For regular (full) files that already exist on disk, another policy may direct the file system to convert them to placeholders and move their data to remote storage. In still another embodiment, the file system may operate in accordance with a policy that directs the file system to dehydrate any placeholder having its "in-sync" attribute set to indicate that its content matches (i.e., is identical to or is "in sync" with) the corresponding content of the file stored remotely. In addition to the "in sync" attribute, other information, such as last access time, user intention/consent, etc., could be tracked or acquired in accordance with these or other policies with the goal being to maintain free disk space at a healthy level all the time. In other embodiments, from the network's perspective, a storage virtualization provider may start throttling or slowing down downloading of file data from the cloud. And, in yet another embodiment, perhaps as a last resort, the system, at the request of a user, may stop serving such I/O requests altogether either for selective applications or globally for all applications. It is understood that any or all of the operations or policies described herein to prevent or provide remediation for excessive hydration may be implemented independently or in any combination.

Figure 11:
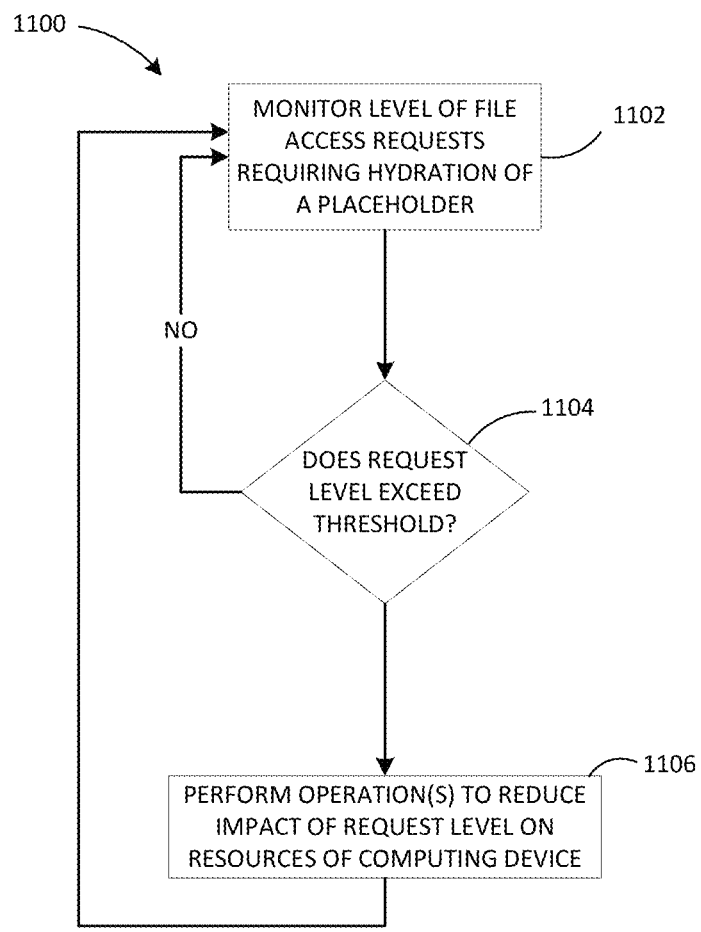
FIG. 11 illustrates a method of preventing excessive hydration in a storage virtualization system in accordance with one embodiment.

FIG. 11 illustrates one embodiment of a method of preventing excessive hydration in accordance with the techniques described herein. In step 1102, as one or more requests to access files for which placeholders are stored on the secondary storage 124 are received from one or more applications executing on the computing device, the level of requests requiring hydration of a placeholder (i.e. retrieval of data from remote storage) is monitored. Next, in step 1104, the monitored level of requests requiring hydration may be compared to a threshold. If the threshold has not been exceeded, then the system will continue to operate normally and continue monitoring (step 1102). If the threshold has been exceeded, then control will pass to step 1106.

In one embodiment, the level of request requiring hydration may simply be a number of such requests received over a particular time period, and the threshold may be a corresponding number determined to represent that an excessive hydration condition exists. Thus, in step 1104, the number representing the determined level of requests requiring hydration may be compared to the threshold number determined to represent excessive hydration. In other embodiments, the level of request activity and its comparison to the threshold may be based instead on a fixed amount or a percentage of available resources of the computing device at a given time. Essentially, steps 1102 and 1104 are intended to monitor for bursts of hydration activities that span across multiple placeholders simultaneously or within a certain (e.g., very short) period of time. The access pattern (e.g., level of access requests) on placeholders can be obtained by monitoring all requests to the placeholders in the file system stack, network usage by storage virtualization providers, or both, in order to detect when that level of activity exceeds the threshold and may impact the resources of the computing device. As mentioned above, in other embodiments, other information may be considered in determining when the threshold has been exceeded to indicate that there is excessive hydration activity. For example, user intention may be taken into account to help differentiate a real runaway hydration case from a legitimate mass hydration case that is either initiated or blessed by the user. It may be effective and efficient to allow the user to participate in the runaway hydration detection but at the same time not overwhelm the user with all trivial popups.

If it is determined in step 1104 that an excessive hydration situation has occurred that requires remediation, then control will pass to step 1106 where one or more operations may be performed to reduce the impact of such excessive hydration on the resources of the computing device, such as available storage space on the secondary storage of the computing device or network bandwidth available to the computing device. As mentioned above, the operation(s) performed in step 1106 may take a variety of forms. For example, in one embodiment, the storage virtualization filter 204 may prevent a given application from opening any more placeholders whose contents do not currently reside on the local secondary storage. In another embodiment, from the perspective of disk space, the file system may choose in step 1106 to continue serving I/O requests on placeholders but not store the returned data on the secondary storage; that is, the requested data may be provided directly to the application requesting the data, without writing the received data to the placeholders on the secondary storage. In yet another embodiment, policies may be enforced in step 1106 to control the response of the computing device when excessive hydration is detected. For example, in one embodiment, the file system may operate in accordance with a policy that directs the file system to dehydrate oldest cached data either periodically or when disk space is urgently required. That is, for any placeholders on the secondary storage that contain at least some data of the file they represent, at least some of those placeholders may be selected to have their cached data moved from the secondary storage to remote storage (i.e., those placeholders may be dehydrated). The selection of which placeholders to dehydrate may be based on criteria including one or more of the age of the cached data, the time the data was last accessed, whether the data is synchronized with the remote storage, and an intent of a user. In another embodiment, for any files that are fully stored on the secondary storage (e.g. regular files), another policy may direct the file system to convert one or more of them to placeholders and move at least some of their data to remote storage. In still another embodiment, the file system may operate in accordance with a policy that directs the file system to dehydrate any placeholder having its "in-sync" attribute set to indicate that its content matches (i.e., is identical to or is "in sync" with) the corresponding content of the file stored remotely. In addition to the "in sync" attribute, other information, such as last access time, user intention/consent, etc., could be tracked or acquired in accordance with these or other policies with the goal being to maintain free disk space at a healthy level all the time. In other embodiments, from the network's perspective, a storage virtualization provider may start throttling or slowing down downloading of file data from the cloud. And, in yet another embodiment, perhaps as a last resort, the system, at the request of a user, may stop serving such I/O requests altogether either for selective applications or globally for all applications. It is understood that any or all of the operations or policies described herein to prevent or provide remediation for excessive hydration may be implemented independently or in any combination in step 1106. Moreover, any of the operations discussed above may be implemented or performed on a per-application basis.

According to another aspect, a timeout mechanism is provided for GetFileData requests from the storage virtualization filter 204 to the storage virtualization provider 202. For example, when the storage virtualization filter 204 sends a GetFileData request to the storage virtualization provider 202, the storage virtualization provider 202 may fail to respond because there is a bug in the provider's program code, the provider code crashes, the provider is hung, or some other unforeseen error occurs. To avoid having the storage virtualization filter 204 wait forever for a response, a timeout period may be set such that when the timeout period expires before any response is received, the storage virtualization filter 204 will stop waiting for the response and, for example, may send a failure indication back to the calling application 130.

According to yet another aspect, a mechanism is provided for canceling GetFileData requests. By way of background, the I/O system in the Windows operating system supports canceling of I/O requests. As an example, when a ReadFile request comes from an application, and it is taking too long to fetch the data, a user can terminate the application which will cancel all outstanding I/O on that file. In one embodiment of the storage virtualization techniques disclosed herein, the storage virtualization filter 204 "pends" I/Os while waiting for the storage virtualization provider 202 to respond, in a way that supports the I/Os being cancelled.

Timeouts and cancellation support are helpful in the presence of inherently unstable mobile network connections where requests may be delayed or lost. When the storage virtualization filter 204 receives a user request and forwards it to the provider 202 running in user mode, it may track the request in a global data structure and the amount of the time that has elapsed since the forwarding of the request. If the storage virtualization provider 202 completes the request in time, the tracking is stopped. But if for some reason the request does not get completed by the provider 202 in time, the filter 204 can fail the corresponding user request with an error code indicating timeout. This way the user application does not have to get blocked for an indefinite amount of time. Additionally, the user application may discard a previously issued request at any time using, for example, the standard Win32 CancelIO API and the filter 204 will in turn forward the cancellation request to the provider 202, which can then stop the downloading at user's request.

According to another aspect, in one embodiment, the storage virtualization filter 204 and storage virtualization provider 202 utilize the native security model of the underlying file system 129 when accessing files. For example, in the case of the NTFS file system of the Window operating system, the security model of Windows checks for access when a file is opened. If access is granted, then the storage virtualization filter 204 will know when a read/write request is received that the file system has already authorized accesses. The storage virtualization filter 204 may then fetch the data from the remote storage as needed.

According to yet another aspect, a request priority mechanism may be employed. In the case of the Windows operating system, for example, the urgency of a user I/O request is modeled/expressed as I/O priority in the kernel I/O stack. In one embodiment, the storage virtualization filter 204 may expand the I/O priority concept to the user mode storage virtualization provider 202 such that the user intention is made aware all the way to the provider 202 and the requests are handled properly based on the user intention.

According to another aspect, the storage virtualization filter 204 may support different hydration policies with the option to allow the provider 202 to validate the data downloaded/stored to the local computing device first and return the data to the user application only after the data is determined to be identical to the remotely stored copy. In one embodiment, there may be three different hydration policies—Full Hydration with End-to-End (E2E) Validation, Full Hydration Without E2E Validation, and Progressive Hydration Without E2E Validation. Both applications 130 and different storage virtualization providers (e.g., provider 202) can define their global hydration policy. In one embodiment, if not defined, the default hydration policy is Progressive Hydration Without E2E Validation for both applications and providers. Preferably, file hydration policy is determined at file open in accordance with the following example formula: File Hydration Policy=max(App_Hydration_Policy, Prov_Hydration_Policy). For example, Word 2016 may specify the "Full Hydration Without E2E Validation" policy, while the Word document is stored by a cloud service whose hydration policy is set at "Full Hydration with E2E Validation." The final hydration policy on this file will be "Full Hydration with E2E Validation." Preferably, hydration policy cannot be changed after a file is opened.

Storage Virtualization for Directories

The storage virtualization techniques described herein may also be applied to directories in a manner similar to how files are treated. In many file systems, directories are implemented as files themselves. As illustrated in FIG. 8A, a directory typically comprises metadata 802 which provides various information about the directory, such as the name of the directory, its length, time of creation, and other information useful to the file system or an application. In addition to the metadata 802, the directory will also contain one or more child directory entries 804. Each child entry may represent a file within the directory or a subdirectory of the directory. For example, a child entry for a file may contain a field that stores attributes associated with the file (such as whether the file is "read only" or "hidden"), a field that stores characters of a file name for the file, one or more fields storing information indicating the date and time of file creation, a field indicating a size of the file, and a field indicating a starting location (e.g., starting cluster) on the storage medium where the data for the file resides. Of course, this is just one example of the format and contents of a child entry, and it is understood that the formats and contents of child entries may differ from file system to file system. A child entry for a subdirectory may comprise similar fields for the file representing the subdirectory. Often a directory is part of a larger hierarchy of directories. The top most directory of such a hierarchy is often referred to as the root directory.

In accordance with the storage virtualization techniques disclosed herein, a placeholder may be created for a directory. FIG. 8B illustrate an example placeholder for a directory. As shown, the placeholder may comprise a file containing: metadata 808, which may include some or all of the metadata 802 of a full directory; none, some, or all child entries 810 of the directory; and information 812 which enables any remotely stored child entries for the directory to be retrieved. Because all or some of the child entries for a directory represented by placeholder directory 806 may not be stored in the directory on secondary storage (e.g., disk 124), the placeholder directory 806 may consume less space in the local storage of a computing device.

With reference to FIG. 8C, in one embodiment, the information 812 which enables the remotely stored child entries for the directory to be retrieved comprises a reparse point 814. As shown, the reparse point 814 is a data structure comprising a tag 816 and accompanying data 818. As described above, the tag is used to associate the reparse point with a particular file system filter in the file system stack of the computing device. In the present embodiment, the tag identifies the reparse point as being associated with the storage virtualization filter 204. In one embodiment, the data 818 of the reparse point 814 may comprise a globally unique identifier associated with the storage virtualization provider 202—to identify the storage virtualization provider 202 as the provider for the actual child entries for the placeholder directory. In addition, the data 818 may comprise an identifier of the directory itself, such as a directory name or other directory identifier.

As in the case of placeholders for files, a storage virtualization provider 202 that is maintaining a full directory hierarchy on remote storage over a network may request that a placeholder be created for a directory. In the case of directories, however, the storage virtualization provider 202 may initially request creation of a placeholder only for the root directory in a remotely stored directory hierarchy. Then, when an application begins to enumerate that directory, the storage virtualization provider 202 may request the creation of additional placeholders for the child directories (i.e., subdirectories) and/or the files under the root directory. As used herein, the phrase "enumerate a directory" and the like refers to a process by which the contents of a directory, including any files or subdirectories (each of which is represented in the directory by one or more respective child entries), may be examined or retrieved (such as in the form a directory listing) upon request to the file system of a computing device.

As with the creation of placeholders for files, the storage virtualization provider 202 can request the creation of a placeholder for a directory, for example, by calling a CreatePlaceholders function of the user-mode library 206. In that example implementation, the library 206 will, in turn, convert that call into a corresponding CreatePlaceholders message to the storage virtualization filter 502. In response to the CreatePlaceholders message, the storage virtualization filter 204 will create an empty directory (i.e., an empty file) that serves as the placeholder for the directory. The storage virtualization filter 204 may then store in the placeholder directory any additional metadata associated with the directory, such as time stamps, access control lists (ACLs), and other metadata supplied by the storage virtualization provider 202 in the CreatePlaceholders message. The storage virtualization filter 204 will then add to the placeholder information which enables any remotely stored child entries of the directory to be retrieved from remote storage. In the embodiment illustrated in FIG. 8C, this information may comprise a reparse point. As described above in connection with FIG. 8C, the reparse point comprises a tag associating it with the storage virtualization filter 204 and data, which may include an identifier of the storage virtualization provider 202 that requested the placeholder and the directory name or other directory identifier given by the storage virtualization provider 202.

Once creation of the placeholder for the directory is completed, the placeholder will appear to a user or application (e.g., application(s) 130) as a directory stored locally on the computing device. That is, the details of the remote storage of the directory is effectively hidden from the applications(s).

Figure 9:
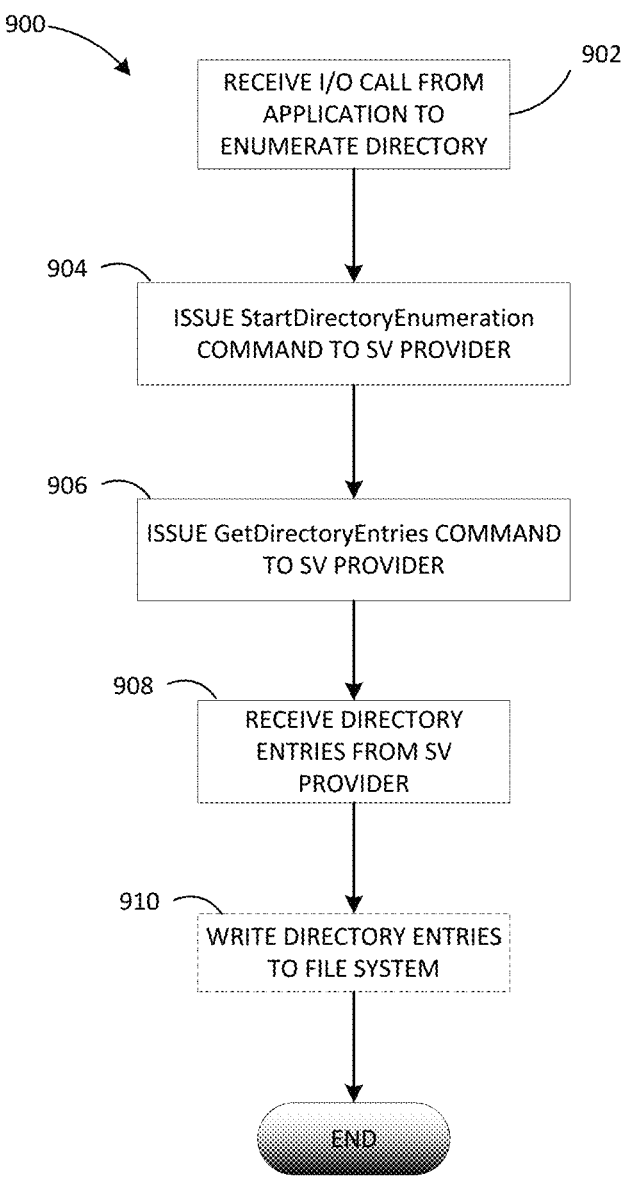
FIG. 9 illustrates a process for enumeration of a placeholder directory, in accordance with one embodiment.

The process for enumeration of a directory represented by a placeholder is similar to the process illustrated in FIG. 6 for accessing data of a placeholder for a file. FIG. 9 illustrates the steps performed by the storage virtualization filter 204 for directory enumeration, in accordance with one embodiment. An application will typically initiate directory enumeration via, for example, a Win32 API call requiring the directory to be enumerated, such as a request to list the contents of the directory or a request to access a file having the directory in its directory path. As in the case of files, this I/O call or request will be passed to the file system 129, which, in the embodiment illustrated herein, will detect the reparse point in the directory placeholder and pass the I/O call back up the file system stack to the storage virtualization filter 204 for processing.

As shown in FIG. 9, in one embodiment, the storage virtualization filter 204 will begin the process at step 902 by issuing a StartDirectoryEnumeration command to the storage virtualization provider 202. Upon receiving this command, the storage virtualization provider 202 will establish a context that can be used throughout a set of enumeration requests for the directory. The StartDirectoryEnumeration command will include the pathname from the root of the remotely stored directory hierarchy to the directory to be enumerated. In step 906, the storage virtualization filter will issue a GetDirectoryEntries command to the storage virtualization provider 202 to request that the storage virtualization provider 202 fetch (i.e., retrieve) all or some range (e.g., 1 to N) of child directory entries of the directory from the remote storage. In one embodiment, the first GetDirectoryEntries command may include a search string, and the storage virtualization provider 202 may only fetch the directory entries that match this search string. The search string could be a full file name, e.g. foo.txt or a wild card name, e.g. foo*. In response to the GetDirectoryEntries command, the library 206 will invoke a corresponding callback function implemented by the storage virtualization provider 202, which will cause the storage virtualization provider 202 to fetch the requested entries from the remote storage and return them to the storage virtualization filter 204. In step 908, the storage virtualization filter 204 receives the fetched directory entries from the storage virtualization provider 202. The received entries may then be returned to the requesting application or other entity that may have triggered the enumeration.

In one embodiment, as illustrated in optional step 910, the child entries received in step 908 may be written to the placeholder for the directory on the secondary storage (e.g., storage 124) of the computing device. This may result in a partial representation of the directory on the secondary storage. On subsequent enumerations, this may result in faster processing, as the child entries needed to satisfy a subsequent enumeration may actually be stored locally on the secondary storage within the placeholder of the enumerated directory. Also, when at least some of the child entries of a directory are stored locally on the secondary storage, the storage virtualization filter 204 may respond to a subsequent enumeration request for the directory by enumerating both the locally stored child entries and the remotely stored child entries and then merging the results before returning the enumerated entries to the requesting application. In one embodiment, in the event of any conflicting entries during that merging process, the locally stored child entries may take precedence over the child entries retrieved from remote storage. That is, if there are versions of the same child entry in both the local storage (e.g., within the directory placeholder on the secondary storage) and in the remotely stored representation of the directory, the locally stored version will be returned to the requesting application instead of the version retrieved from remote storage. Alternatively, in other embodiments, a policy may be established by which the child entries retrieved from remote storage take precedence over any locally stored child entries.

Once the enumeration is completed, in one embodiment, the storage virtualization filter 204 may end the enumeration process by issuing a EndDirectoryEnumeration command to the storage virtualization provider 202, and upon receiving this command, the storage virtualization provider 202 will free any resource(s), e.g. memory or opened handles, used during the process.

The process of writing fetched child entries to local storage is different for directories than it is for files. As mentioned above, the storage virtualization provider 202 may initially request creation of a placeholder directory only for the root directory in a remotely stored directory hierarchy. Then, when an application begins to enumerate that directory, the storage virtualization provider 202 may request the creation of additional placeholders for the child subdirectories and/or the files under the root. Alternatively, the storage virtualization filter 204 may decide whether to create additional placeholders for the child subdirectories and/or the files under the root. For example, the remotely stored directory hierarchy maintained by the storage virtualization provider 202 on remote storage may have the hierarchy illustrated in FIG. 10. As shown, the example hierarchy has a root directory called "foo," which contains files "1.txt," "2.txt," "3.txt" and a subdirectory called "bar." When the application requests to enumerate the root directory foo, the process described above will return the child entries for the files 1.txt, 2.txt, and 3.txt and the child entry for the subdirectory bar. But at that point, the only item stored on the secondary storage of the computing device is the directory foo. Accordingly, in conjunction with this directory enumeration, the storage virtualization provider 202 may also then request the storage virtualization filter 204 to create placeholders for each of the files 1.txt, 2.txt, and 3.txt and for the subdirectory bar.

Continuing this example, at this point the on-disk representation of the directory hierarchy will include the directory foo, and the placeholders for 1.txt, 2.txt, and 3.txt and the subdirectory bar. Suppose that the remotely stored virtualized directory hierarchy further includes a file with the path foo\\bar\foo1\bar1\5.txt and that an application requests that file. The storage virtualization filter 204 will need to fetch and create placeholders for each of the additional subdirectories foo1 and bar1 as well as the file 5.txt. In accordance with the storage virtualization techniques disclosed herein, the storage virtualization filter 204 can request this all at once or it can be requested in an iterative process.

More specifically, in one embodiment, the storage virtualization filter 204 may attach a reparse processing flag to the request so that when the application's request for that file reaches the file system, if the last component of the partial on-disk directory hierarchy representation ("bar" in the example) contains the reparse point tag of the storage virtualization filter 204, the file system will complete the request with STATUS_REPARSE.

In the virtualization filter's handler to this status code, it issues a GetPlaceholderInformation command to the storage virtualization provider 202 with the name of the next component relative to the virtualization root, e.g., bar\foo1 in the present example. Upon receiving this command, the storage virtualization provider 202 checks if the requested path exists in the remote storage, and if yes, the virtualization provider 202 returns to the storage virtualization filter 204 the information necessary to create a placeholder for foo1. The storage virtualization filter 204 will then create a file named foo1 under the foo\bar\ folder that serves as the placeholder for foo1 and set the reparse point on this file, then re-issue the application's request. The virtualization filter 204 will repeat the process to have placeholders for the components bar1 and 5.txt created. Note that in other embodiments, instead of the virtualization filter 204 automatically creating a placeholder for each component upon receiving from the virtualization provider 202 the information necessary to create the placeholder, the virtualization provider 202 may instead request the creation of a placeholder for each component by calling the CreatePlaceholders function of the user-mode library as it iterates through each component of the path.

After 5.txt is created on the secondary storage, since 5.txt is the last component in the request, the virtualization filter 204 will clear the reparse processing flag before re-issuing the request. The file system 129 will then complete the request with STATUS_SUCCESS this time so that the request will complete and return to the application.

Figure 10:
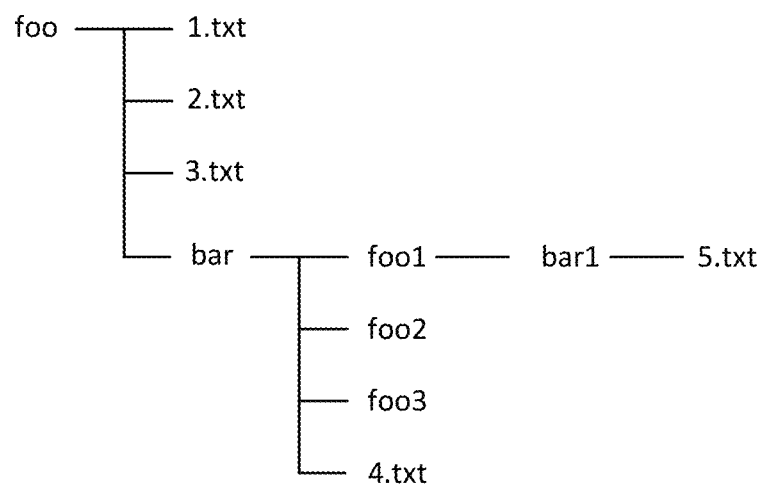
FIG. 10 is a diagram of an example directory hierarchy.

Because of the nature of directory enumeration, it is possible that the local on-disk representation of a directory hierarchy—using placeholders—may not be complete. For example, when enumerating the path foo\bar\foo1\bar1\5.txt, placeholders may be created for subdirectories foo1 and bar1 and the file 5.txt. However, it could be the case that the directory foo\bar also contains subdirectories foo2 and foo3 (as illustrated in FIG. 10). Placeholders may not have been created for those subdirectories. Thus, the placeholders for the subdirectories foo, bar, foo1, bar1, and 5.txt may form a partial representation of the full directory hierarchy stored remotely on the network. Moreover, it is possible for an application to make changes to the local on-disk representation. For example, an application may create a new file 6.txt in the directory foo\bar\foo1\bar1. Or the application could delete the file 5.txt from that directory or rename the file. According to a further aspect of the storage virtualization techniques described herein, the storage virtualization filter 204 and storage virtualization provider 202 may perform a synchronization operation to ensure that any partial representation of the directory hierarchy on disk remains synchronized with the corresponding portion of the full directory hierarchy on the remote storage.

Because a goal of the storage virtualization techniques disclosed herein is to hide the details of the remote storage from applications such that the existence of directories and files appears to an application as if they were all stored and maintained locally, any changes to the on-disk representation by an application should take precedence. Accordingly, when changes are made by the file system in response to a request from an application, such as deleting or renaming a file, a mechanism is needed to inform the storage virtualization provider 202 during a merge operation that such a change has occurred to ensure that other applications will not be able to open or see this file in subsequent directory enumerations. In accordance with another aspect of the storage virtualization techniques disclosed herein, the concept of a tombstone is introduced. A tombstone is information that remains on the secondary storage of the computer device (e.g., disk 124) after a file or directory represented by a placeholder is deleted or renamed by an application. In one embodiment, a tombstone may be implemented by a new flag or attribute in the metadata of a placeholder for a file or directory that has been deleted. The flag indicates that the file or directory has been deleted or renamed, and the storage virtualization filter 204 and storage virtualization provider 202 may cooperate to ensure that the deletion or renaming represented by the tombstone is made to the full directory hierarchy on the remote storage when synchronizing the on-disk and remote storage representations.

The illustrations of the aspects described herein are intended to provide a general understanding of the structure of the various aspects. The illustrations are not intended to serve as a complete description of all of the elements and features of apparatus and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

The various illustrative logical blocks, configurations, modules, and method steps or instructions described in connection with the aspects disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the present disclosure.

The various illustrative logical blocks, configurations, modules, and method steps or instructions described in connection with the aspects disclosed herein, or certain aspects or portions thereof, may be embodied in the form of computer executable instructions (i.e., program code) stored on a computer-readable storage medium which instructions, when executed by a machine, such as a computing device, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The description of the aspects is provided to enable the making or use of the aspects. Various modifications to these aspects will be readily apparent, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed:

1. In a computing device comprising a processor, memory, and secondary storage, the memory storing computer-executable instructions that, when executed by the processor, implement a file system for managing the storage of files on the secondary storage, a method for storage virtualization of files, comprising:

storing, on the secondary storage, a plurality of placeholder for a respective plurality of files, each file comprising data which is stored on a network remotely from the secondary storage, each placeholder containing metadata associated with its respective file, a sparse data stream containing none or some data of the respective file, and information which enables any remotely stored data of the respective file to be retrieved from the network;

receiving, from one or more applications executing on the processor of the computing device, one or more requests, each request comprising a request to access a file for which a placeholder is stored on the secondary storage;

determining, for each received request to access a file, whether the request requires that data of the file be retrieved from remote storage on the network;

monitoring a level of such requests requiring retrieval of data from the remote storage;

determining, based on a number of received requests requiring data to be retrieved from remote storage, that the monitored level of requests has satisfied a threshold, the determining that the threshold is satisfied being further based on an indication of user input associated with the one or more requests; and performing operations, in response to determining that the threshold has been satisfied, to reduce an impact of such level of requests on resources of the computing device.

2. The method recited in claim 1, wherein the resources may comprise one or more of available storage space on the secondary storage of the computing device and network bandwidth.

3. The method recited in claim 1, wherein determining that the threshold is satisfied is based on a number of received requests requiring data to be retrieved from remote storage.

4. The method recited in claim 1, wherein determining that the threshold is satisfied is based on one of a fixed amount or a percentage of available resources of the computing device.

5. The method recited in claim 1, the operations are performed on a per-application basis.

6. The method recited in claim 1, the operations comprising preventing an application from opening a file for which a placeholder has been created where the data of the file does not reside in the placeholder on the secondary storage.

7. The method recited in claim 1, the operations comprising, for at least one of the requests determined to require retrieval of data from the remote storage:

transmitting to a storage virtualization provider one or more corresponding requests to retrieve the remotely stored data;

receiving, from the storage virtualization provider, the requested data; and providing the requested data directly to the application requesting the data, without writing the received data to the secondary storage.

8. The method recited in claim 1, the operations comprising, for any placeholders on the secondary storage that contain at least some data of the file they represent, selecting at least one of the placeholders and moving the data contained in the at least one selected placeholder from the secondary storage to remote storage.

9. The method recited in claim 8, the at least one of the placeholders being selected based on criteria including one or more of age of the data, the time the data was last accessed, whether the data is synchronized with the remote storage, and an intent of a user.

10. The method recited in claim 1, the operations comprising, for any files that are fully stored on the secondary storage, converting at least one of those files to a placeholder and moving at least some of the data of the file to remote storage.

11. A computing device comprising a processor, a memory, and secondary storage, the memory storing executable instructions that, when executed by the processor, cause the computing device to perform operations comprising:

storing, on the secondary storage, a plurality of placeholder for a respective plurality of files, each file comprising data which is stored on a network remotely from the secondary storage, each placeholder containing metadata associated with its respective file, a sparse data stream containing none or some data of the respective file, and information which enables any remotely stored data of the respective file to be retrieved from the network;

receiving, from one or more applications executing on the processor of the computing device, one or more requests, each request comprising a request to access a file for which a placeholder is stored on the secondary storage;

determining, for each received request to access a file, whether the request requires that data of the file be retrieved from remote storage on the network;

monitoring a level of such requests requiring retrieval of data from the remote storage;

determining, based on a number of received requests requiring data to be retrieved from remote storage, that the monitored level of requests has satisfied a threshold, the determining that the threshold is satisfied being further based on an indication of user input associated with the one or more requests; and performing operations, in response to determining that the threshold has been satisfied, to reduce an impact of such level of requests on resources of the computing device.

12. The computing device recited in claim 11, wherein determining that the threshold is satisfied is based on a number of received requests requiring data to be retrieved from remote storage.

13. The computing device recited in claim 11, wherein determining that the threshold is satisfied is based on one of a fixed amount or a percentage of available resources of the computing device.

14. The computing device recited in claim 11, the operations comprising preventing an application from opening a file for which a placeholder has been created where the data of the file does not reside in the placeholder on the secondary storage.

15. The computing device recited in claim 11, the operations comprising, for at least one of the requests determined to require retrieval of data from the remote storage:

transmitting to a storage virtualization provider one or more corresponding requests to retrieve the remotely stored data;

receiving, from the storage virtualization provider, the requested data; and providing the requested data directly to the application requesting the data, without writing the received data to the secondary storage.

16. The computing device recited in claim 11, the operations comprising, for any placeholders on the secondary storage that contain at least some data of the file they represent, selecting at least one of the placeholders and moving the data contained in the at least one selected placeholder from the secondary storage to remote storage.

17. The computing device recited in claim 16, the at least one of the placeholders being selected based on criteria including one or more of age of the data, the time the data was last accessed, whether the data is synchronized with the remote storage, and an intent of a user.

18. The computing device recited in claim 11, the operations comprising, for any files that are fully stored on the secondary storage, converting at least one of those files to a placeholder and moving at least some of the data of the file to remote storage.

* * * * *